Oct. 27, 1936.   R. K. EVANS   2,058,580
COMPOSITE CHASSIS BODY STRUCTURE
Filed Aug. 5, 1935   2 Sheets-Sheet 1

Inventor
Ronald K. Evans

By Blackmore, Spencer & Flint
Attorneys

Oct. 27, 1936.    R. K. EVANS    2,058,580
COMPOSITE CHASSIS BODY STRUCTURE
Filed Aug. 5, 1935    2 Sheets-Sheet 2
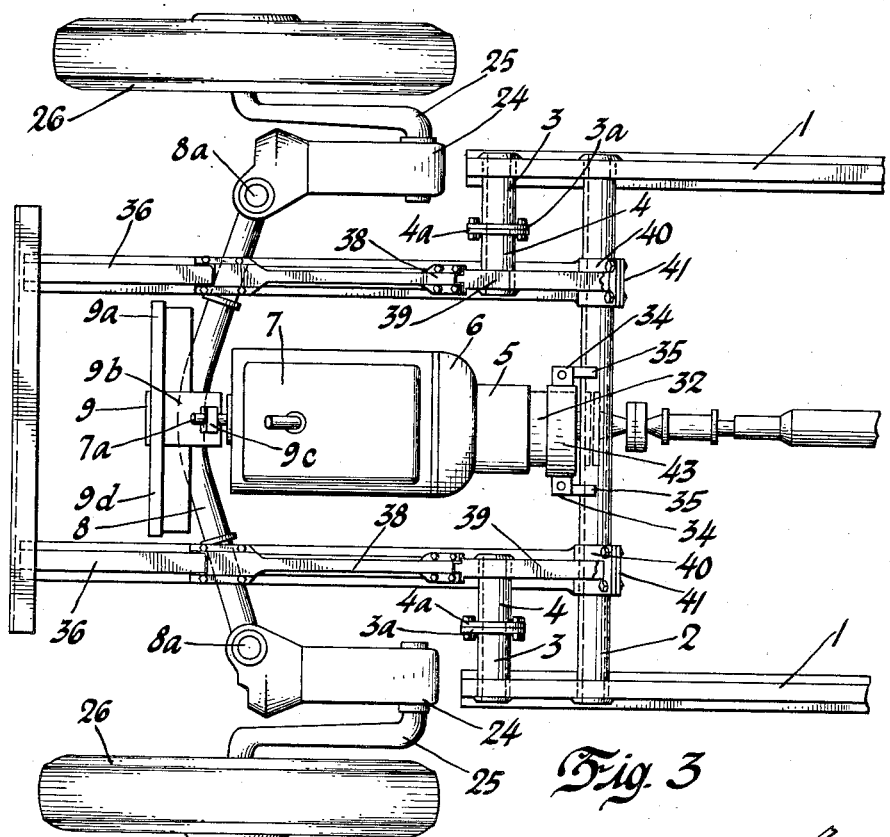
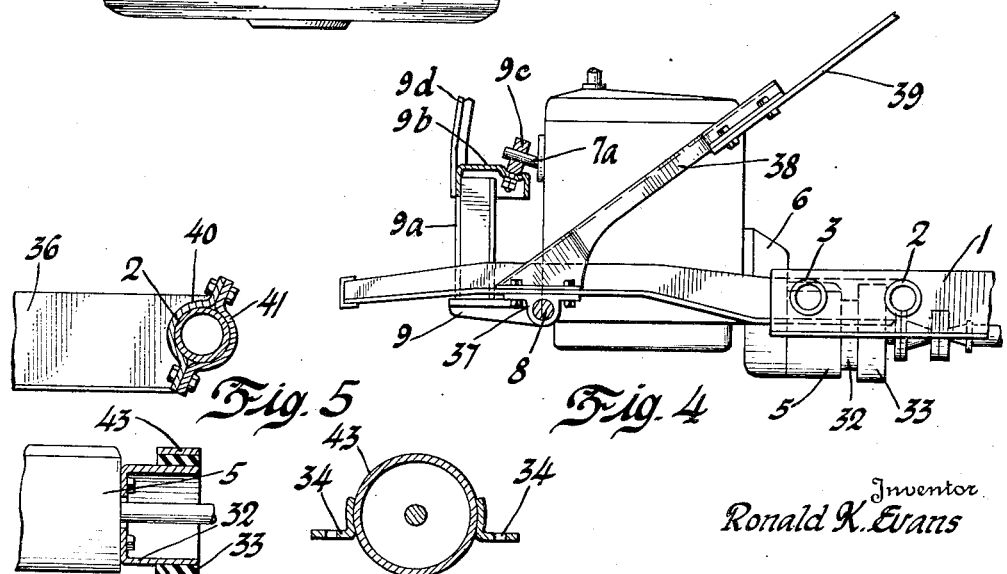
Inventor
Ronald K. Evans Patented Oct. 27, 1936

2,058,580

UNITED STATES PATENT OFFICE 2,058,580

COMPOSITE CHASSIS BODY STRUCTURE

Ronald K. Evans, Russelsheim-on-the-Main, Germany, assignor to General Motors Corporation, Detroit, Mich., a corporation of Delaware Application August 5, 1935, Serial No. 34,743
In Germany December 3, 1934

7 Claims. (Cl. 180—64)

This invention relates to a self-sustaining vehicle body for automotive vehicles, the body being so constructed that the body forms at the same time the underframe of the vehicle. The underframe is suitably made of a main frame of the width of the vehicle body, and front and rear smaller frames on which the wheel axles, the motor, etc., are mounted. This manner of construction makes possible an especially simple and inexpensive producton of the vehicle body; it has, however, the disadvantage that in case of damage to the front frame as a result of collision, etc., the entire vehicle frame must be disassembled and the damaged part replaced. However undesirable this may be, nevertheless such damaging occurs relatively frequently and appreciably increases the cost of maintenance of the vehicle. The object of the invention is, therefore, the building of the self-supporting vehicle with the retention of its composite underframe in such a way that an easy replacement of a badly damaged longitudinal support of-the front part of the vehicle frame is made possible.

According to the invention, the front underframe carrying the motor and front axle is separably connected to the main frame, which actually carries the vehicle body frame. The separable connection is so applied that the front frame together with the motor may be removed from the underframe as a unit. This has the additional advantage that repairs to the motor may be made without removing or disassembling the motor.

The drawings show two species of the invention.

Figure 3 is a plan view similar to Figure 1 of a modification.

Figure 4 is a side view of the structure of Figure 3 with the wheels springing unit removed.

Figure 5 is a detail of the connection between the front and main frames.

Figures 6 and 7 are sectional details of the mounting for the rear end of the engine unit.

Figure 1:
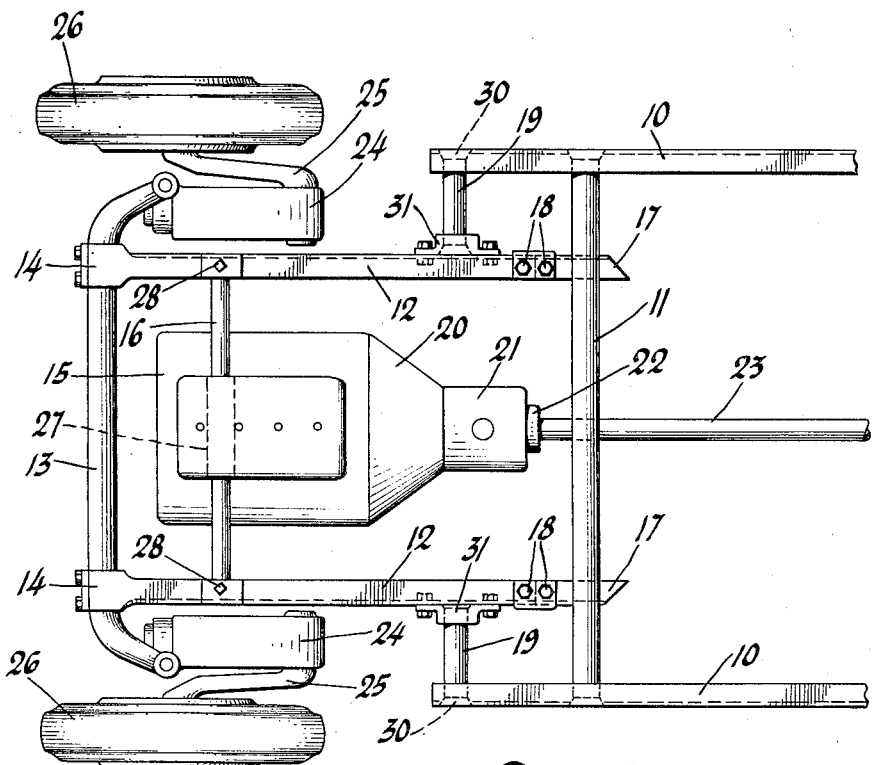
Figure 1 is a plan view of the front end of a vehicle frame.

The longitudinal supports 10, together with the tubular transverse supports 11 and other transverse supports (not shown), form the main frame of the underframe. Secured to the main frame is the front frame, composed of the longitudinal supports 12 and the front axle 13, the latter being adjustably secured in a known way in bearings 14 in the longitudinal supports. The front axle 13, moreover, carries the spring housings 24 and the oscillatable lever 25 of the front wheels 26, likewise the necessary parts (not shown) for the steering of the wheels.

The motor 15 is positioned on the longitudinal supports 12. This is accomplished by means of a transverse support 16 which passes through the engine block as at 27 and is bolted onto the longitudinal supports 12 as shown at 28. To the engine block 15 there are secured in a known way the clutch 20 and the transmission 21, the latter being separably connected with the Cardan shaft 23 by a connection 22. The rear support of the engine block is not indicated for reasons of clearer illustration. It may be carried out in any suitable way.

A flanged and bolted connection 18 serves releasably to connect the front frame 12, 12, 13 with connecting members 17 which are welded as at 29 to the tubular transverse support 11. In order to take care of bending and torsional requirements there is provided still a second connection with the longitudinal supports, this connection being formed of tubular parts which are welded at 30 to the supports 10 and connected to the longitudinal supports 12 by means of releasable gusset or flanged connections 31. By means of the above described manner of connection of the front frame to the main frame it is possible to remove the front frame after disconnecting the flanged connections 18, 19, 31, and the connection 22 of the transmission 21 with the Cardan shaft 23.

The species of Figures 3–7 inclusive relates to a further improvement of the described arrangement. The engine block is no longer positioned on a specific transverse support but upon the support for the front wheels. Additionally, however, it is so united with the vehicle body framing that it may be removed from the vehicle frame along with the front axle and the longitudinal supports of the foreframe.

The mounting of the engine block on the front axle according to the invention has the advantage that the assembly of the entire vehicle is made appreciably easier, and it is at the same time possible to place the vehicle body as a whole on the vehicle, while the engine block and the Cardan shaft are mounted on the two wheel supports. In this way the same simple assembly is obtained as in the case of vehicles which have a body separable from the chassis.

Figure 2:
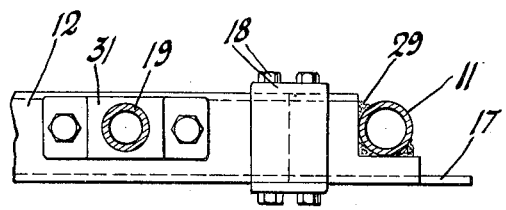
Figure 2 is a detail of the connection between the front frame and the main frame.

In contrast to the species of Figures 1 and 2 this advantage is gained, that all the component parts of the framing are first of all positioned in their relative positions and then may be fastened from below to the vehicle body.

The longitudinal supports of the main frame are designated by 1, the front transverse support by 2, the tubular members for the stiffening of the connection of the longitudinal supports of the foreframe by 3 and 4.

The transmission housing 5, clutch housing 6, and engine block 7 are combined in a single housing in the usual way. The engine block is mounted at its front on the axle 8 of the front wheel assembly. For this purpose a plate 9 is welded to the axle 8. On the plate 9 there is mounted a basketlike support 9a, with a transverse support 9b for the reception of a bearing head 9c which serves to position the stud 7a secured to the housing. A loop 9d to support the hood is secured to the support 9a.

For the housing 5 a rear mounting is provided so that the withdrawal of the engine block from the front is possible. The details of this mounting are shown in Figures 6 and 7. To the housing 5 a ring 32 is bolted over which there is applied a rubber ring 33 which may be united with the ring 32 by vulcanization. For the mounting of the ring 32 there is used a second ring 43 which is provided with members 34. The ring 43 is placed over the rubber ring 33 and may or may not, as desired, be vulcanized thereto. By means of these members the ring 43 may be united to the supporting arms 35 which are welded to the transverse support 2.

The connection between the axle and the longitudinal supports 36 of the foreframe is made through bearing brackets 37 bolted to the supports. On the axle 8 there are turnably mounted at 8a in the usual way the spring housings 24 in which the swinging levers 25 for the wheels 26 are arranged. The securing bolts for the locating brackets 37 also serve to secure the stiffening member 38 secured to the windshield frame 39.

The longitudinal supports 36 are separably connected to the transverse supports by means of locating brackets 40 and 41. On the tubes 3 and 4 opposed flanges 3a and 4a are welded and these flanges may be united by bolts.

With the described arrangement it is now possible, after disconnecting the flanges 3a and 4a and the brackets 40 and 41, to remove the longitudinal supports and the engine block forwardly from the underframe. On the other hand, by disconnecting the brackets 37, it is also possible to raise the underframe and the body built thereon.

I claim:

1. In a frame construction for vehicles, separable front and rear frame portions, said front portion comprising two longitudinals and a front transverse connection, said rear frame portion including two longitudinals and a transverse connecting member, the longitudinals of the rear frame portion extending forward beyond the ends of the longitudinals of the front frame portion, connecting members extending inwardly from the rear longitudinals, connecting members extending outwardly from the front longitudinals, said inwardly and outwardly connecting members abutting and being secured together, and means to secure the longitudinals of the front frame portion to the transverse connecting member of the rear frame portion.

2. In a frame construction for vehicles, separable front and rear frame portions, said front portion comprising two longitudinals, a transverse brace and an axle, stiffening members inclined upwardly and rearwardly from the front frame portion, common means to secure the longitudinals, axle and the ends of the stiffening members together, said rear frame portion including two longitudinals and a transverse member, means to interconnect the longitudinals of the frame portions to each other, and means to connect the transverse member of the rear frame portion to the longitudinals of the front frame portion.

3. In combination with a vehicle frame comprising a rear frame and a separable foreframe having lateral longitudinals, means connecting the front and rear ends of the longitudinals, a front wheel assembly including an axle removably and rigidly secured directly to the foreframe, an engine mounted at one end on the axle, and means to mount the other end of the engine.

4. In combination with a vehicle frame comprising a rear frame and a separable foreframe having lateral longitudinals, means connecting the front and rear ends of the longitudinals, a front wheel assembly including an axle removably and rigidly secured directly to the foreframe, an engine mounted at one end on the axle, means to mount the other end of the engine, a windshield frame, stiffening members connected to the windshield frame and extending to the foreframe and secured to the longitudinals.

5. In a vehicle frame, in combination, a rear frame, a foreframe, means separably to connect the fore and rear frames, an axle removably and rigidly connected to the foreframe, an engine mounted at one end on the axle, a transmission housing rigid with said engine, a ring secured to the housing, a second ring secured to the rear frame and surrounding the first ring to support the transmission, and a resilient cushion between said rings.

6. In a vehicle frame, in combination, a rear frame, a foreframe, means separably to connect the fore and rear frames, an axle removably and rigidly connected to the foreframe, an engine mounted at one end on the axle, a transmission housing rigid with said engine, and means resiliently to support the transmission housing and the other end of the engine from the rear frame.

7. In a vehicle frame, in combination, a rear frame, a foreframe, means separably to connect the fore and rear frames, an axle removably and rigidly connected to the foreframe, an engine mounted at one end on the axle, a transmission housing rigid with said engine, a ring secured to the housing, a second ring surrounding the first ring, brackets secured to the second ring and to the rear frame to support the ring, and a resilient cushion between said rings resiliently to mount the transmission and the rear end of the engine.

RONALD K. EVANS.